No. 711,658. Patented Oct. 21, 1902.
J. D. GARFIELD.
COMBINED DOOR AND BELLOWS SUPPORT FOR CAMERAS.
(Application filed Mar. 17, 1902.)
(No Model.)

Witnesses:
M. Horrier
M. A. Campbell

Inventor
Julius D. Garfield

THE NORRIS PETERS CO., PHOTO-LITHO., WASHINGTON, D. C.

UNITED STATES PATENT OFFICE.

JULIUS D. GARFIELD, OF SPRINGFIELD, MASSACHUSETTS, ASSIGNOR OF ONE-HALF TO GEORGE BERNARD, OF BOSTON, MASSACHUSETTS.

COMBINED DOOR AND BELLOWS-SUPPORT FOR CAMERAS.

SPECIFICATION forming part of Letters Patent No. 711,658, dated October 21, 1902.

Application filed March 17, 1902. Serial No. 98,490. (No model.)

*To all whom it may concern:*

Be it known that I, JULIUS D. GARFIELD, a citizen of the United States of America, and a resident of Springfield, in the county of Hampden and State of Massachusetts, have invented certain new and useful Improvements in a Combined Door and Bellows-Support for Cameras, of which the following is a full, clear, and exact description.

My invention relates to cameras, and especially to that class known as "reflecting-cameras," in which the rays of light coming through the lens are deflected by an inclined mirror onto a horizontally-arranged ground-glass screen at the top of the camera. The size of this ground-glass screen in this type of camera is usually the size of the photographic plate used. Thus the longitudinal dimensions of the camera must in its most compact form be as long as is required for a full-sized ground glass and for a mirror to swing therein that will reflect all the rays required to reproduce a full image on the ground glass, and heretofore this space has not been utilized for any other purpose than as above described, the storage of the bellows and lens-carriage and lens requiring a space beyond the limits of the space required for the mirror to swing in. The object of my invention is to utilize this space for the storage of the bellows and lens when the same are not in use, and to this end I have invented a combined camera door and bellows-support of novel construction and a hinge-joint therefor which permits the folding up and delivering into the exposing-chamber of a camera the ordinary bellows and photographic lens that in this type of cameras heretofore have required a large amount of valuable space for their accommodation, that has made this class of cameras objectionable by reason of their necessary length.

Figure 1:
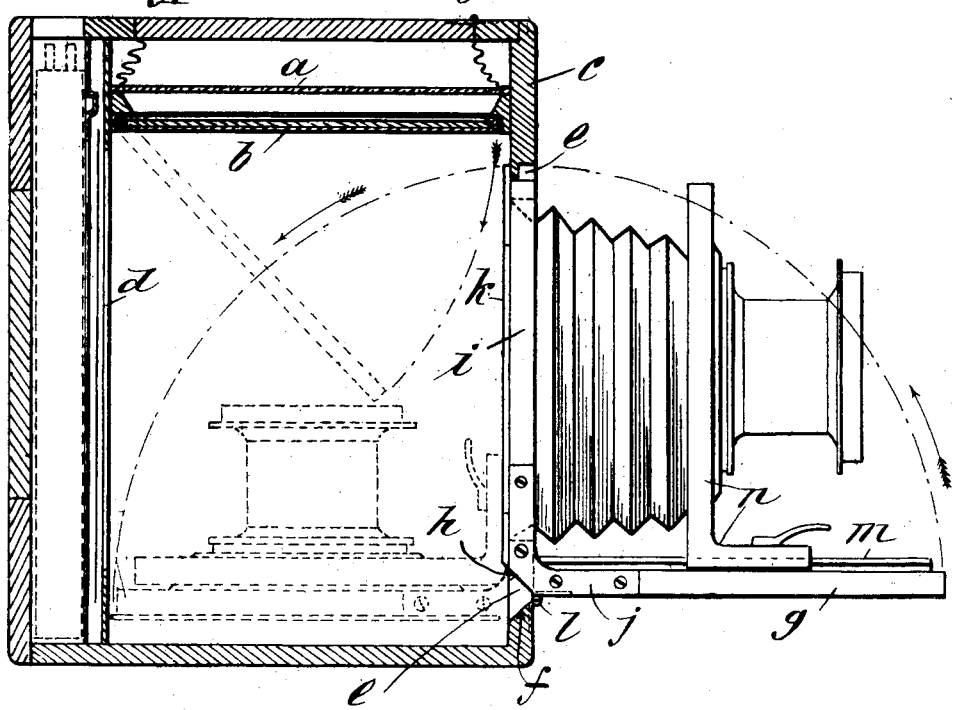
Figure 2:
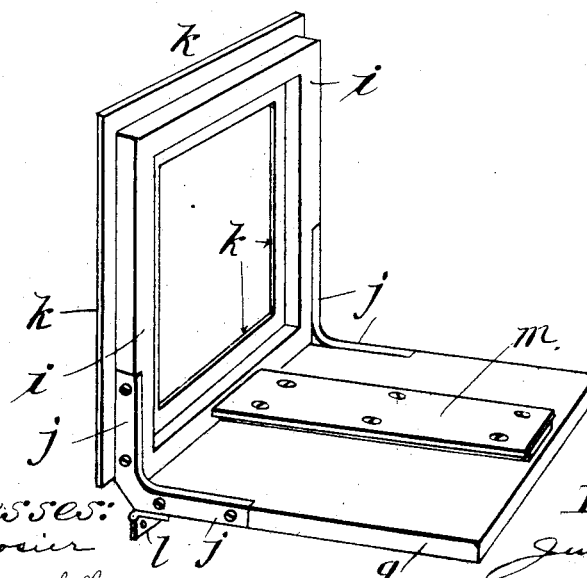

In the drawings, Figure 1 is substantially a longitudinal sectional view of the camera. Fig. 2 is a perspective view showing the door and bellows and lens support.

A is a camera-box and is provided near its top with a ground-glass screen $a$, and directly below this is pivoted a mirror $b$, adapted to swing to an inclined position. (Shown in dotted lines.)

The front wall $c$ of the camera and the wall $d$ at the rear of the exposing-chamber are located at the least distance from each other that will permit of a full-sized ground glass, as $a$, and at the same time give sufficient room for a mirror of adequate size to swing in.

The front wall $c$ is provided with a door-opening $e$ and at its lower edge is beveled, as shown at $f$, and hinged to swing into a line flush with the wall $e$ is a door $g$, whose hinged edge is also beveled, as shown at $h$. Supported on this door at the hinged end thereof and at right angles thereto is a bellows-frame $i$, which is strongly attached to the door $g$ by the metal elbow or angle plates $j\, j$. The rear side of this bellows-frame $i$ is provided with a thin frame K, which projects on its upper end and its two sides somewhat beyond the frame $i$, constituting a flange, which by its contact with the front wall $c$ forms a firm support for the door and lens, as seen in Fig. 1, and also serves to exclude light from entering around the sides and top of the frame $i$ at the lower edge of the frame $i$.

A long hinge $l$, similar to a piano-hinge, may be used, thus excluding light that might enter through the crack at this point, although if the camera is leather-covered, as usual, any suitable hinge would do.

The door $g$ may be provided with a guide or slideway $m$ and an ordinary lens-carriage $n$.

Having thus described my invention, what I claim, and desire to secure by Letters Patent, is—

1. A camera, having an exposing-chamber and in the front thereof an opening, a door for said opening hinged at its lower edge, and a lens mounted on said door, and having a position thereon for use when the door is swung horizontally forward and open, and adapted to be carried with the door, in the closing of the latter, to occupy a position within the exposing-chamber.

2. A camera having an exposing-chamber, and in the front thereof an opening, a door for said opening hinged at the lower boundary thereof, and adapted to swing downwardly forwardly to a horizontal position, and having, projecting from adjacent its hinged edge, a rigidly-connected bellows-frame, the bellows, and lens connected to said bellows-frame, and all adapted when the door is swung open to permit the bellows to be forwardly distended thereon for use, and when the door is vertical and closed to permit the lens and collapsed bellows to be disposed with the then horizontal bellows-frame in the lower part of the exposing-chamber.

Signed by me at Springfield, Massachusetts, this 26th day of February, 1902.

JULIUS D. GARFIELD.

Witnesses:
WM. S. BELLOWS,
M. A. CAMPBELL.